US012688292B2

(12) United States Patent
Zimmermann et al.

(10) Patent No.: US 12,688,292 B2

(45) Date of Patent: Jul. 21, 2026

(54) COMPUTER-IMPLEMENTED METHOD FOR MITIGATING ANOMALOUS ACTIVITY

(71) Applicant: Robert Bosch GmbH, Stuttgart (DE)

(72) Inventors: Christian Zimmermann, Stuttgart (DE); Christopher Huth, Heilbronn (DE); Fredrik Kamphuis, Weeze (DE); Paulius Duplys, Markgroeningen (DE); Peter Munk, Renningen (DE); Tobias Gehrmann, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 30 days.

(21) Appl. No.: 18/835,751

(22) PCT Filed: Feb. 9, 2022

(86) PCT No.: PCT/EP2022/053052

§ 371 (c)(1),
(2) Date: Aug. 5, 2024

(87) PCT Pub. No.: WO2023/151778

PCT Pub. Date: Aug. 17, 2023

(65) Prior Publication Data

US 2025/0139247 A1 May 1, 2025

(51) Int. Cl.
*G06F 21/56* (2013.01)
*G06F 21/55* (2013.01)
*G06F 21/60* (2013.01)

(52) U.S. Cl.
CPC .......... *G06F 21/566* (2013.01); *G06F 21/554* (2013.01); *G06F 21/602* (2013.01)

(58) Field of Classification Search
CPC ..... G06F 21/566; G06F 21/554; G06F 21/602
(Continued)

(56) References Cited

U.S. PATENT DOCUMENTS

| | | | | |
|---|---|---|---|---|
| 9,948,615 B1* | 4/2018 | Davis | .................. | H04L 63/0428 |
| 11,329,953 B2* | 5/2022 | Atad | .................... | H04W 76/15 |

(Continued)

FOREIGN PATENT DOCUMENTS

EP 3751825 A1 12/2020

OTHER PUBLICATIONS

International Standard ISO/IEC 27039: Information technology— Security techniques—Selection, deployment and operations of intrusion detection and prevention systems (IDPS), (2016), pp. 1-56.

(Continued)

*Primary Examiner* — Michael S McNally

(74) *Attorney, Agent, or Firm* — NORTON ROSE FULBRIGHT US LLP

(57) ABSTRACT

A computer-implemented method for mitigating anomalous activity in an embedded computer system including a plurality of communicably coupled embedded processing elements. The method includes: detecting a transmission of an anomalous message in the embedded computer system; transmitting at least one notification to a plurality of embedded processing elements in the embedded computer system, wherein the notification is encrypted using a cryptographic key; in at least one embedded processing element of the plurality of processing elements: receiving the at least one notification; identifying, at the at least one embedded processing element, that the at least one notification has been encrypted using the cryptographic key; and reconfiguring the at least one processing element from a first mode into a second mode, wherein the at least one processing element presents a reduced functionality to the embedded computer system in the second mode.

15 Claims, 4 Drawing Sheets

(58) Field of Classification Search
USPC ............................................................ 726/22
See application file for complete search history.

(56) References Cited

U.S. PATENT DOCUMENTS

| | | | | |
|---|---|---|---|---|
| 2018/0300477 A1* | 10/2018 | Galula | ................ | H04L 63/1416 |
| 2019/0260800 A1* | 8/2019 | Shalev | ................ | H04L 63/0428 |
| 2024/0378288 A1* | 11/2024 | Hussain | ................... | G06N 5/01 |
| 2025/0175478 A1* | 5/2025 | Fang | ....................... | H04L 67/75 |

OTHER PUBLICATIONS

International Search Report for PCT/EP2022/053052, Issued Jul. 26, 2022.
Kornaros et al., "Towards Holistic Secure Networking in Connected Vehicles Through Securing Can-Bus Communication and Firmware-Over-The-Air Updating," Journal of Systems Architecture, vol. 109, 2020, pp. 1-13. https://sci-hub.ru/10.1016/j.sysarc.2020.101761 Downloaded Aug. 1, 2024.

* cited by examiner detect transmission
of anomalous
message — 12 transmit notification — 14 receive the
notification — 16 identify the notification
has been encrypted using
cryptographic key — 18 reconfigured from first
mode to second mode — 20

10

30

34D    IDPS    36 processing
element

38

32

34A    34B    34C processing
elements

Fig. 3

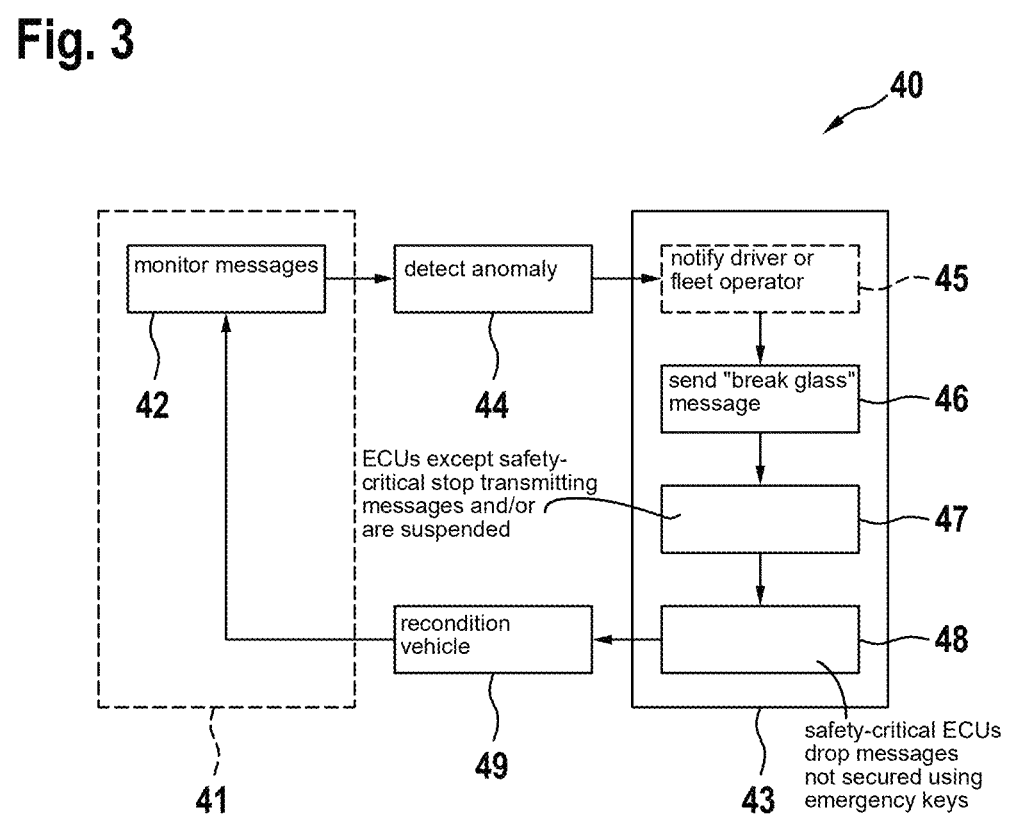

40 monitor messages

42 detect anomaly

44 notify driver or fleet operator

45 send "break glass" message

46

47 recondition vehicle

49

48

ECUs except safety-critical stop transmitting messages and/or are suspended safety-critical ECUs drop messages not secured using emergency keys

50 processing element input
interface memory

56 output
interface

52

58 processor

54

COMPUTER-IMPLEMENTED METHOD FOR MITIGATING ANOMALOUS ACTIVITY

FIELD

The present specification relates to a computer-implemented method for mitigating anomalous activity in an embedded computer system comprising a plurality of communicably coupled embedded processing elements, and an associated embedded computer system, vehicle, and computer program element.

BACKGROUND INFORMATION

Modern vehicles are equipped with, and controlled via a large number of electronic control units (ECUs). The ECUs are connected by an in-vehicle network (IVN) using, for example, CAN, LIN, automotive Ethernet, or other network technology. A trend is that connectivity from a vehicle network to external entities such as wireless base stations or other vehicle networks is increasing. ECUs themselves are increasingly being replaced by more centralized processors having higher performance. In turn, these improved ECUs run software that is progressively becoming more complex.

Therefore, in-vehicle networks are becoming an increasingly attractive target for cyber criminals and other parties interested in compromising in-vehicle networks. For example, manipulation of existing messages, or injection of extra messages into the IVN constitutes a particularly severe threat, as this can easily lead to safety risks. Accordingly, in-vehicle networks may be further improved.

SUMMARY

According to a first aspect of the present invention, there is provided a computer-implemented method for mitigating anomalous activity in an embedded computer system comprising a plurality of communicably coupled embedded processing elements.

According to an example embodiment of the present invention, the method includes:

- detecting a transmission of an anomalous message in the embedded computer system;
- transmitting at least one notification to a plurality of embedded processing elements in the embedded computer system, wherein a portion of the notification is encrypted using a cryptographic key;
- in at least one embedded processing element of the plurality of processing elements: receiving the at least one notification:
- identifying, at the at least one embedded processing element, that the at least one notification has been encrypted using the cryptographic key; and
- reconfiguring the at least one processing element from a first mode into a second mode, wherein the at least one processing element presents a reduced functionality to the embedded computer system in the second mode.

An effect is that an in-vehicle intrusion detection system is provided that enables the most critical ECUs of a vehicle to continue to work during a security event such as a network intrusion according to a minimal function set necessary for safe operation of the vehicle. This enables a vehicle to remain operational during a security event (such as a hacking attempt), whilst minimising the attack surface.

According to a second aspect of the present invention, there is provided an embedded computer system comprising a plurality of processing elements, an intrusion detection system, and a communications network configured to communicably couple the plurality of processing elements and the intrusion detection system. According to an example embodiment of the present invention, either at least one processing element, and/or the intrusion detection system is configured to detect a transmission of an anomalous message in the embedded computer system, and, upon detection of an anomalous message in the embedded computer system, to transmit at least one notification to a plurality of embedded processing elements in the embedded computer system, wherein a portion of the notification is encrypted using a cryptographic key. At least one processing element of the plurality of processing elements is configured to receive the at least one notification, to identify that the at least one notification has been encrypted using a cryptographic key, and to reconfigure the at least one processing element from a first mode into a second mode, wherein the at least one processing element presents a reduced functionality to the embedded computer system in the second mode.

According to a third aspect of the present invention, there is provided a vehicle comprising the embedded computer system according to the second aspect of the present invention.

According to a fourth aspect of the present invention, there is provided a computer program element comprising machine readable instructions which, when executed by at least one processing element, cause the processing element to perform the computer-implemented method according to the first aspect or its embodiments, and optionally a computer-readable medium comprising the computer program element so defined.

In the following specification, the term "processing element" is synonymous with electronic processing unit (ECU).

BRIEF DESCRIPTION OF THE DRAWINGS

Exemplary embodiments of the present invention are depicted in the figures, which are not to be construed as limiting the present invention, and are explained in greater detail below.

FIG. 3 schematically illustrates an example of an intrusion mitigation approach of an embedded computer system, according to an example embodiment of the present invention.

FIG. 5 schematically illustrates a computer apparatus, according to an example embodiment of the present invention.

DETAILED DESCRIPTION OF EXAMPLE EMBODIMENTS

An intrusion detection and prevention system IDPS is configured, for example, to monitor an embedded computer system, and to detect successful and unsuccessful attempts at comprising the embedded computer system. For example, an IDPS may detect spoofed messages, injected messages, or manipulated messages on a CANBUS network, and act in response to such detection. An example of such action is shutting down components or functions, or preventing compromised components from sending further messages, generating a log message, or informing a remote monitoring centre. If the embedded computer system monitored by the IDPS is incorporated in a vehicle, the IDPS may inform the driver of the vehicle. In other domain areas outside of the vehicular domain (such as a web server, for example), a response to the detection of an intrusion could involve locking or shutting down the server upon detection of an intrusion.

Such a response is often not acceptable in the vehicular domain, because shutting down a vehicle ECU whilst the vehicle was driving would risk disturbing the controllability and safety of the vehicle, and present a risk to occupants. Accordingly, the present specification is concerned with an intrusion detection system capable of safely reacting to a detected intrusion. In brief, the specification concerns how to enable a vehicle's ECUs to remain operational with a minimal set of functionality until a secure state can be restored. This enables the vehicle to remain operational whilst attack is taking place.

Figure 1:
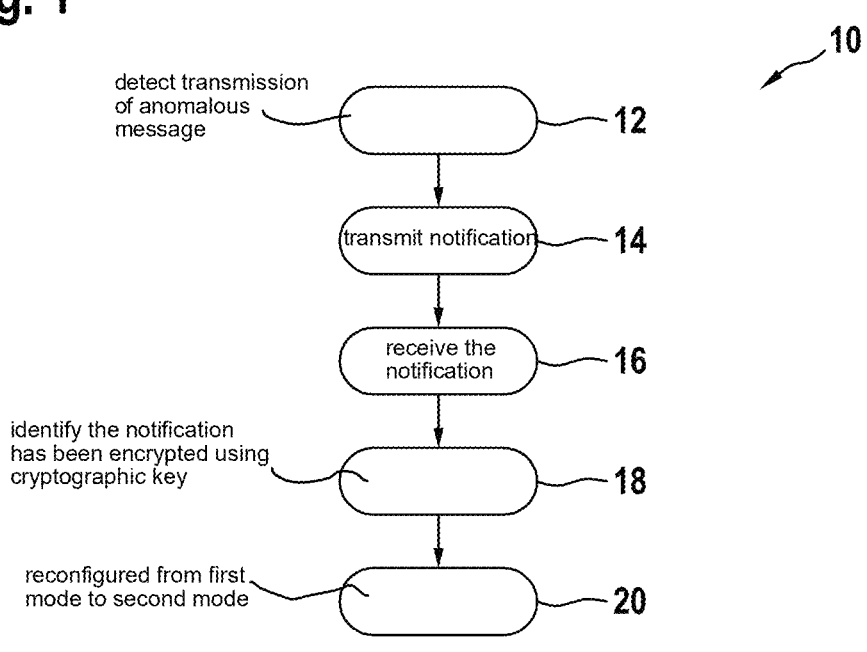
FIG. 1 schematically illustrates an example method according to the first aspect of the present invention.

FIG. 1 schematically illustrates a method according to the first aspect.

According to a first aspect, there is provided a computer-implemented method 10 for mitigating anomalous activity in an embedded computer system 30 comprising a plurality of communicably coupled embedded processing elements 34A-D by:

> detecting 12 a transmission of an anomalous message in the embedded computer system;
> transmitting 14 at least one notification to a plurality of embedded processing elements in the embedded computer system, wherein the notification is encrypted using a cryptographic key;
> in at least one embedded processing element of the plurality of processing elements: receiving 16 the at least one notification;
> identifying 18, at the at least one embedded processing element, that the at least one notification has been encrypted using the cryptographic key; and
> reconfiguring 20 the at least one processing element from a first mode into a second mode, wherein the at least one processing element presents a reduced functionality to the embedded computer system in the second mode.

Figure 2:
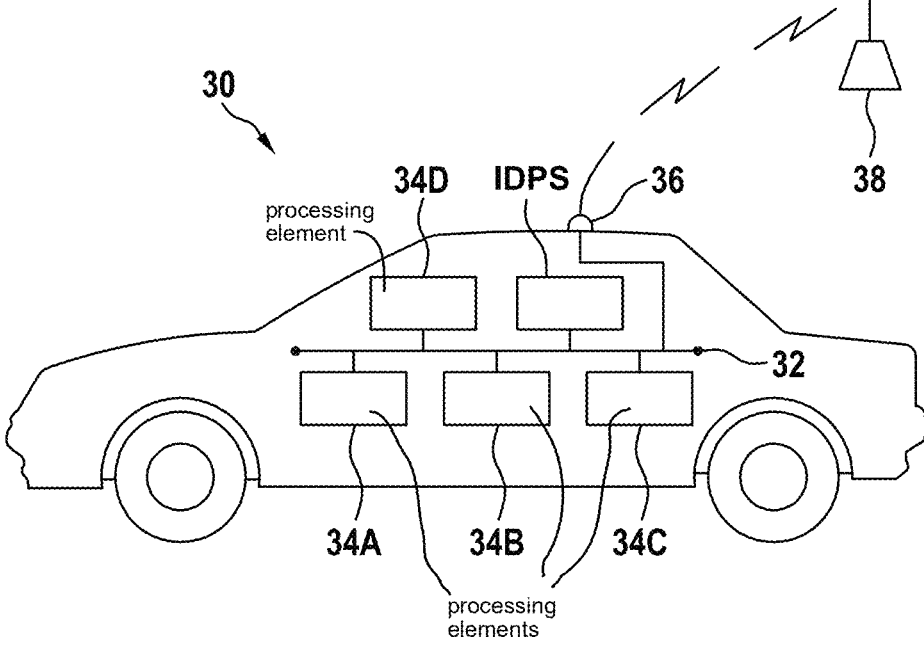
FIG. 2 schematically illustrates an example embedded computer system according to a second aspect of the present invention.

FIG. 2 schematically illustrates an embedded computer system 30 according to a second aspect.

According to a second aspect, there is provided an embedded computer system 30 comprising a plurality of processing elements 34A-D, an intrusion detection system IDPS, and a communications network 32 configured to communicably couple the plurality of processing elements and the intrusion detection system.

Either at least one processing elements 34A-D, and/or an intrusion detection system IDPS is configured to detect a transmission of an anomalous message in the embedded computer system 30. Upon detection of an anomalous message in the embedded computer system 30, the IDPS is configured to transmit at least one notification to the plurality of embedded processing elements 34A-D in the embedded computer system 30. The notification is encrypted using a cryptographic key.

At least one processing element 34A of the plurality of processing elements 34A-D is configured to receive the at least one notification, to identify that the at least one notification has been encrypted using the cryptographic key, and to reconfigure the at least one processing element from a first mode into a second mode, wherein the at least one processing element presents a reduced functionality to the embedded computer system in the second mode.

For example, the embedded computer system 30 may be comprised inside a vehicle. The communications network is, for example, a CANBUS, LIN network, or automotive Ethernet network. The communications network may comprise a Bluetooth™, 3GPP, or Wi-Fi™ network. In particular, the communications network may be communicably coupled to a radio interface 36, enabling wireless communications between the embedded computer system 30 and at least one external communications interface 38. The radio interface 36 is an example of an interface that may enable an external intruder to access at least one processing element 34A-D in the embedded communications system. The embedded computer system 30 further comprises a plurality of processing elements 34A-D (electronic control units, ECUs). A subset of the processing elements 34A, B perform safety critical functions, such as engine control and brake system control. These processing elements should not be deactivated under any circumstances whilst the vehicle is under the control of a human driver. A subset of the processing elements 34C, D may perform functions that are not safety critical. For example, processing element 34C is an infotainment system, and processing element 34D is an air conditioning system controller.

The intrusion detection system IDPS is communicably coupled to the automotive communications network. In an example, the intrusion detection system IDPS is a stand-alone ECU. In an example, the IDPS may function as an application within a software environment executed on one of the other ECUs of the embedded computer system 30. In an example, the IDPS is hosted on a gateway of the embedded computer system 30. In an example, the IDPS is hosted on a domain controller of the embedded computer system 30. In an example, the IDPS is distributed across a plurality of components of the embedded computer system 30.

Anomalous activity is, for example, a detection by the IDPS of an unexpected messaging interaction on a vehicular network. For example, such an interaction by a honeypot ECU, so that when a remote adversary performs a port-scan on the vehicular network, a honeypot ECU that is not expected to be addressed by any other ECU on the network may be addressed by the remote adversary. In response, the honeypot ECU may report to the intrusion detection system that anomalous behaviour is occurring on the vehicular network. Anomalous activity may also be detected by monitoring software function calls on a conventional (non-honeypot) ECU. Anomalous activity may be detected by performing packet inspection on one or more messages detected on the vehicular network. A packet inspection ECU may decode one or more messages on the vehicle network, and identify that an unexpected field of a message is being used, or that a message follows an unusual traffic pattern, is being transmitted at an unusual time in the context of vehicle operation, for example.

According to an embodiment, the transmission of an anomalous message in the embedded computer system is detected by one, or a combination of, (i) detection of an anomalous call to a decoy application programming interface of an application hosted by at least one embedded processing element, (ii) detection of an anomalous communication to a decoy embedded processing element, or (iii) detection of an anomalous message via packet inspection in the embedded computer system.

As soon as an intrusion is detected, the IDPS transmits a notification to a plurality of ECUs communicably coupled to the vehicular communications network denoting the presence of an intrusion. In an example, the notification may be transmitted to a subset of the plurality of ECUs communicable coupled to the vehicular communications network. For example, the subset may represent ECUs associated with safety critical driving functionality. For example, the subset may represent ECUs having enhanced functionality (such as an ability to host an operating system). The notification may be transmitted from the IDPS to each ECU individually, or the notification may be relayed between ECUs in a distributed manner.

Upon receiving the notification, the receiving ECU switches from a first mode into a second mode. Therefore, the purpose of the notification is to inform the receiving ECU that an anomalous activity has been detected on the vehicular network, and to cause the receiving ECU to change function in response. In an example, the change of function from a first mode to a second mode is intended to reduce the attack surface to the external attacker responsible for the anomalous activity detected on the vehicle network. In the case of a non-safety critical ECU (such as an infotainment system) the non-safety critical ECU may be powered down or disabled in response to the reception of the notification. In the case of a safety-critical ECU, the functionality of the ECU may be reduced to a subset of the usual functionality of the ECU. For example, the vehicle display ECU usually comprises a set of functions designed to report the status of the engine, the speed of the car, as well as weather information and the like. When transitioning into the second mode, the vehicle display ECU may be reconfigured so that it only displays the speed of the car (essential to safe driving) but does not display ancillary weather information.

The notification is partially or fully encrypted using a cryptographic key. The cryptographic key is not used in normal operation of the vehicle network. For example, the cryptographic key is shared with the ECUs connected to the vehicle network in a pre-provisioning step. Therefore, each ECU in the vehicle network can authenticate the notification in a fail-safe manner. Furthermore, there is no way for an intruder to reverse the sending of the notification. In an embodiment, the notification is a break-glass message.

Of course, it is not essential that the detection of the intrusion occurs on the vehicle or within the vehicle communications network. Data transmitted from the vehicle to an external monitoring station may be analysed for the presence of unusual messaging interactions implying that an anomalous access to the vehicular network has been made.

According to an embodiment, there is provided, for each processing element comprised in a first subset of the plurality of processing elements, a step of reconfiguring the processing elements to present a reduced functionality to the embedded computer system. The step comprises suspending the operation of each processing element of the first subset of the plurality of processing elements or suspending at least one function provided by each processing element comprised in the first subset.

For example, the infotainment ECU 34C and the air conditioning control ECU 34D are suspended, or powered down. As another example, the infotainment ECU 34C may present a reduced functionality by being configured only to present, via display means, a message informing the user that a reduced-functionality mode has been active, and requesting that the vehicle is taken to a supplier garage for diagnostic tests.

According to an embodiment, there is provided, for each processing element comprised in a second subset of the plurality of processing elements, a step of reconfiguring the processing elements to present a reduced functionality to the embedded computer system. The step comprises suspending at least one function provided by each processing element comprised in the second subset.

According to an embodiment, upon reconfiguration into the second mode, for at least one processing element comprised in the second subset of the plurality of elements, ignoring, at the at least one processing element, all messages received by the at least one processing element that were not encrypted using a cryptographic key associated with the notification.

In this example, any intruder will not have access to the cryptographic key used to encrypt the notifications in the second mode. An authorized process hosted by a first ECU 34A may communicate, by encrypting a notification, to a second ECU 34B. The second ECU 34B is, therefore, assured that the communication has originated from a permitted party on the automotive communications network 32. In contrast, a process instantiated by an intruder on one of the ECUs 34A-D does not have access to the cryptographic key used to encrypt the notifications in the second mode. Accordingly, upon receiving a notification that is not partially, or fully encrypted using the cryptographic key, the receiving ECU 34A-D can automatically discard the notification, or forward it to the intrusion detection system for analysis.

According to an embodiment, upon reconfiguration into the second mode:

initiating at least one trusted execution environment associated with at least one processing element;

receiving, at the at least one processing element, a message;

processing the message within the trusted execution environment, wherein the message is decrypted using a pre-shared cryptographic key.

A trusted execution environment is a segregated area of a CPU for performing computations with a high degree of integrity. The trusted execution environment comprises a hardware root of trust based on a non-volatile set of private keys that may be used to allow a trusted application to use the segregated area of the CPU to perform high security computations. In the present embodiment, upon entering the second mode, an ECU provides a notification that has been encrypted using a cryptographic key to a manager of the trusted execution environment. The trusted execution environment and the ECU perform critical and relevant calculations. Noncritical calculations that are not accompanied by the break-glass notification are not performed by the trusted execution environment. The use of a trusted execution environment enforces a tight coupling to a trust anchor, such as a hardware or dedicated environment, which is slower than a conventional processor, but more trustworthy.

According to an embodiment, upon reconfiguration into the second mode:

generating, using at least one processing element, a message to be transmitted to a further processing element comprised in the plurality of processing elements;

obfuscating a portion of the message to be transmitted to a further processing element; and transmitting the message comprising the obfuscated portion to the further processing element.

According to an embodiment, upon reconfiguration into the second mode, the network addresses of the processing elements communicably coupled to the communication network are randomized. In an example, CAN address randomization is performed.

For example, when the automotive communication network is a CAN network, CAN identifier randomization is performed in the second mode. ECUs having randomized CAN identifiers make it significantly more difficult for an attacker to transmit messages to a targeted ECU. Enabling CAN randomization using the break-glass scheme discussed in this application means that fewer ECUs are allowed to transmit messages, and thus fewer CAN IDs are used, leading to a lower overlap in the randomized ID space. Randomized CAN IDs can keep their original priority, and although slower to calculate and verify, may be more trustworthy than non-randomized addresses.

When randomized CAN IDs are used in the second mode, predefined CAN IDs cannot be used by an attacker. The attacker has to calculate the particular pseudo random noise sequence to successfully guess the random CAN IDs, in order to continue the attack.

According to an embodiment, the embedded computer system is a vehicle control system.

According to an embodiment, upon reconfiguring the at least one processing element from a first mode to a second mode, at least one processing element transmits a notification message reporting the detection of the anomalous message to a driver of the vehicle, and/or a vehicle fleet monitoring centre. Accordingly, a driver, fleet operator, or security management centre may be made aware of the intrusion. This may be particularly important for the driver. For example, if, as a result of reduced functionality, the vehicle cannot manoeuvre as well, or is speed-limited, a driver should be informed of the existence of the second mode so that they understand why the vehicle is performing according to a reduced performance envelope. In one example, a dashboard display may inform the driver that the vehicle is operating in the second mode.

According to an embodiment, upon reconfiguring the at least one processing element from a first mode to a second mode, the reduced functionality of the at least one processing element enables the vehicle to drive with a reduced, or minimal, feature set.

According to an embodiment, transmitting at least one reset notification to a plurality of embedded processing elements in the embedded computer system, and at each processing element, reconfiguring the respective processing element from the second mode to the first mode upon reception, at the respective processing element, of the reset notification. Therefore, once the intrusion detection system IDPS is aware that the security anomaly has been addressed, the ECUs may be set back into the first mode, enabling full functionality of the embedded computer system 30 to be used. In an example, an ECU that contains a computer that is infected with malware may be replaced with a new ECU, When the IDPS detects that the infected ECU is no longer communication on the automotive communication network 32, the IDPS transmits a reset notification to the ECUs.

FIG. 3 schematically illustrates an example of an intrusion mitigation approach of an embedded computer system.

In a safe state 41, the IDPS carries out monitoring 42 of messages in the communications network 32. As described previously, an anomaly may be detected 44 using a technique such as packet inspection, or a honeypot ECU or application interface. A "break-glass" response is initiated, by the transmission of a notification that has been partially or fully encrypted using a "break glass" technique to ECUs in the communications network 32. A driver or fleet operator may optionally be notified 45.

The IDPS sends 46 a "break glass" message to at least one ECU communicably coupled to the communications network 32, and preferably all ECUs. The message is integrity-protected using a special key that is not used during normal operation. The emergency key (or cryptographic material that can derive a cryptographic key on demand) has been pre-shared with all ECUs in the set of safety critical ECUs. As an alternative, distributed components of a distributed IDPS may detect an intrusion and trigger the sending of break glass messages (notifications encrypted with a cryptographic keys).

At 47, All ECUs other than those in the safety-critical set of ECUs stop transmitting messages, and/or are suspended. As an extension, each ECU in the set of crucial ECUs comprises a feature list, with a set of safety critical features, and non-safety critical features. Upon reception of the encrypted notification, the safety critical ECU suspends all features comprised in the list of non-safety critical features. Therefore, the vehicle enters a "limp home" mode. This way, even if the attacker manages to compromise one or more ECUS, the functionality of that ECU within the vehicle, and the remaining attack surface, are minimized. In turn, this increases the likelihood that the security vulnerability initially exploited by the attacker (and thus, the compromised ECU), cannot be utilized for subsequent movement through the communications network 32.

At 48, ECUs in the set of safety critical ECUs that receive the encrypted notification drop messages not secured using the emergency keys, and stop using any other key than the emergency key.

At 49, the vehicle may, for example, be reconditioned in a workshop, with a reset message being transmitted to all ECUs once an infected ECU has been replaced.

Figure 4:
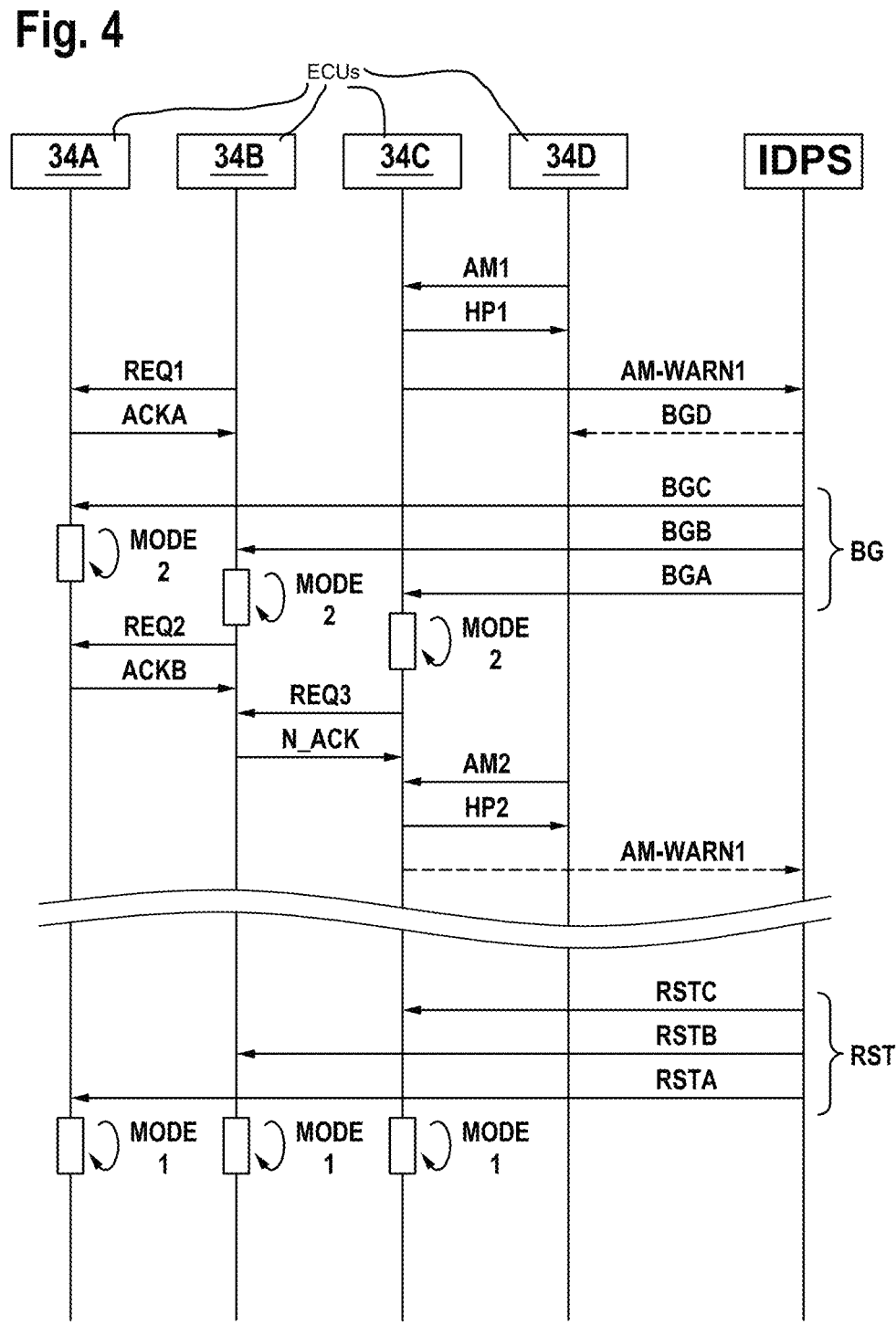
FIG. 4 schematically illustrates an example of a communication process associated with an embedded computer system, according to an example embodiment of the present invention.

FIG. 4 schematically illustrates an example of a communication process associated with an embedded computer system.

In an example, the air conditioning ECU 34D is infected with a malware instance. ECU 34C may comprise a honeypot API instance. The malware instance, whilst performing a port scan of the communications network 32, triggers the honeypot API instance in the ECU 34C. In turn, the honeypot API instance sends an AM-WARN1 signal to the IDPS, whilst also responding to the malware instance with a HP1 response signal (so that the malware instance is not alerted to its detection).

ECU 34A and 34B, involved in safety critical driving processes, communicate normally using the REQ1 and ACK1 signals, for example. Meanwhile, the IDPS sends a plurality of break glass signals BG to ECUs in the communications network 32. The break glass signals are messages encrypted using a cryptographic key that can be matched to a cryptographic function in each of the ECUs 34A-C, causing them to enter a second mode. Sending a BG signal to the infected ECU 34D is optional because this may alert the malware hosted by the infected ECU 34D to detection. At least ECUs 34A, 34B, 34C enter a second mode.

ECUs 34A and 34B are safety critical ECUs associated with performing driving functions, and they continue to operate even when in mode 2. However, ECU 34C is not comprised in the set of essential ECUs. Its request to the safety critical ECU 34B REQ3 is either ignored by the ECU 34B, or a negative acknowledge N_ACK signal is sent to ECU 34C. This prevents an attack vector in the malware of ECU 34D from being able to access a safety critical ECU 34B via the ECU 34C, for example. In mode 2, ECU 34C may continue to provide honeypot responses AM2 to messaging attempts from the infected ECU 34D, so that the infected ECU 34D is not made aware of the entry into effect of the second operation. The IDPS may transmit reset signals RST, once the risk from the infected ECU 34D has been removed (such as by reformatting the ECU or replacing it).

According to a third aspect, there is provided a vehicle comprising the embedded computer system according to the second aspect.

According to an embodiment, the vehicle according to the third aspect is provided, wherein, upon reconfiguration of at least one processing element of the embedded computer system from a first mode into a second mode, the at least one processing element presents a reduced functionality to the embedded computer system in the second mode, thus causing the vehicle to operate with a reduced feature set.

Figure 5:
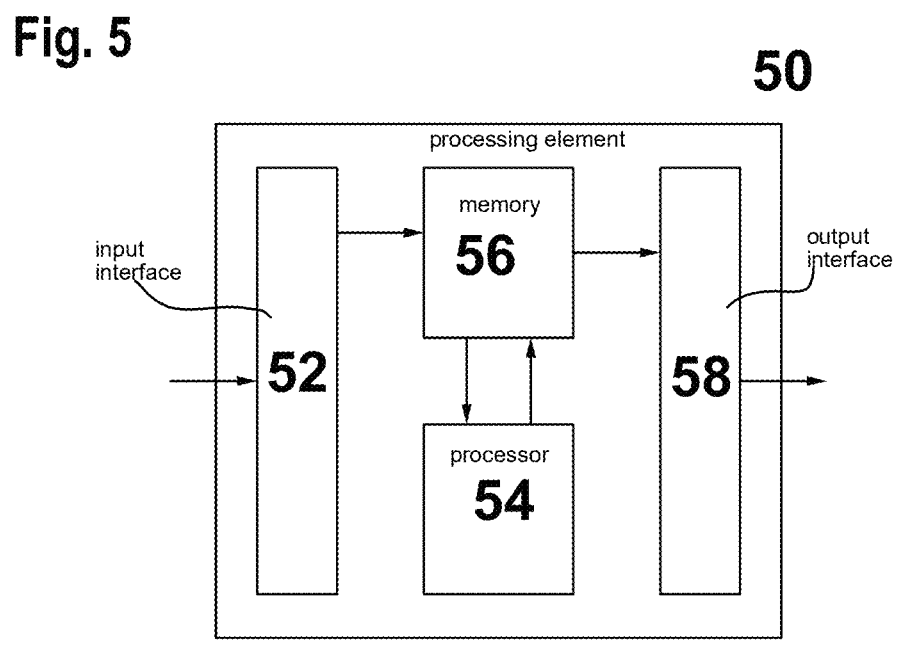

According to a fourth aspect, a computer program element comprising machine readable instructions which, when executed by at least one processing element, cause the processing element to perform the computer-implemented method according to the first aspect, or its embodiments, and optionally a computer-readable medium comprising the computer program element so define FIG. 5 schematically illustrates a processing element 50 used to provide an ECU. The processing element 50 comprises an input interface 52, a processor 54, a volatile and/or non-volatile memory 56, and an output interface 58. The input interface 52 and output interface 58 may be combined as a CANBUS interface, automotive ethernet interface or a LIN interface, for example. A portion of the input interface 52 is communicably coupled to a sensor of a vehicle, or a user input interface, for example. A portion of the output interface 58 is communicably coupled to an actuator capable of effecting a safety critical action, such as a brake or gearbox actuation signal. The non-volatile memory is configured to store operating instructions for the ECU, and is provisioned with cryptographic material that may be used to verify an incoming notification as a "break glass" message. When software executing on the processor 56 receives a message that is verified as a "break glass" message, the processor changes from operating in a normal mode to a "break glass mode", in which a portion of the functionality of the ECU is disabled whilst safety critical operations continue, or where the ECU itself is turned off or suspended.

Computer implementations based on the foregoing embodiments may be implemented using a wide variety of software approaches. Programs, program modules, scripts, functions, and the like can be designed in languages such as JavaScript, C++ or C, Java, PHP, RUBY, PYTHON, or other languages.

The computer readable medium is configured to store a computer program, application, logic including machine code capable of being executed by a processor. The computer readable medium includes RAM, ROM, EEPROM, and other devices that store information that may be used by the processor. In examples, the processor and the computer readable medium are integrated on the same silicon die, or in the same packaging. In examples, the computer readable medium is a hard disc drive, solid state storage device, or the like. In an example, a signal comprising computer readable instructions may be communicated over a data communication network such as the Internet as a download, or software update, for example.

The examples provided in the figures and described in the foregoing written description are intended for providing an understanding of the principles of this specification. No limitation to the scope of the present invention is intended thereby. The present specification describes alterations and modifications to the illustrated examples. Only the preferred examples have been presented, and all changes, modifications and further applications to these within the scope of the specification are desired to be protected.

The invention claimed is:

1. A computer-implemented method for mitigating anomalous activity in an embedded computer system, the embedded computer system including a plurality of communicably coupled embedded processing elements, the method comprising the following steps:

detecting, by an embedded processing element of the plurality of the embedded processing elements, a transmission of an anomalous message in the embedded computer system, the embedded computer system transitioning from a normal operation to an emergency operation in response to the detection of the transmission of the anomalous message;

transmitting, by the embedded processing element upon the detection of the transmission of the anomalous message, at least one notification to a further plurality of the embedded processing elements in the embedded computer system, wherein a portion of the at least one notification is encrypted using a cryptographic key, and wherein the cryptographic key is a dedicated emergency key used only during the emergency operation and not used during the normal operation of the embedded computer system; and by at least one embedded processing element of the further plurality of the embedded processing elements:

receiving the at least one notification;

identifying, at the at least one embedded processing element, that the at least one notification has been encrypted using the dedicated emergency key; and reconfiguring the at least one embedded processing element from a first mode into a second mode, wherein the at least one embedded processing element presents a reduced functionality to the embedded computer system in the second mode.

2. The computer-implemented method according to claim 1, wherein the transmission of an anomalous message in the embedded computer system is detected by one or a combination of: (i) detection of an anomalous call to a decoy application programming interface of an application hosted by at least one of the embedded processing elements, or (ii) detection of an anomalous communication to a decoy embedded processing element, or (iii) detection of an anomalous message via packet inspection in the embedded computer system.

3. The computer-implemented method according to claim 1, further comprising:

for each embedded processing element included in a first subset of the plurality of embedded processing elements, the reconfiguring into a reduced functionality includes suspending operation of each embedded processing element of the first subset of the plurality of embedded processing elements, or suspending at least one function provided by each embedded processing element in the first subset.

4. The computer-implemented method according to claim 1, further comprising:

for each embedded processing element included in a second subset of the plurality of embedded processing elements, the reconfiguring into a reduced functionality includes suspending at least one function provided by each embedded processing element in the second subset.

5. The computer-implemented method according to claim 4, further comprising:

for at least one embedded processing element in the second subset of the plurality of embedded processing elements:

upon reconfiguration into the second mode, ignoring, at the at least one embedded processing element in the second subset of the plurality of embedded processing elements, all messages received by the at least one processing embedded element in the second subset of the plurality of embedded processing elements that do not contain a cryptographic key associated with the notification.

6. The computer-implemented method according to claim 1, further comprising:

upon reconfiguration into the second mode:

initiating at least one trusted execution environment associated with at least one embedded processing element, wherein the at least one trusted execution environment comprises a segregated area of a CPU;

receiving, at the at least one embedded processing element, a message; and processing the message within the trusted execution environment, wherein the message is decrypted using a pre-shared cryptographic key.

7. The computer-implemented method according to claim 1, further comprising:

upon reconfiguration into the second mode:

generating, using at least one embedded processing element, a message to be transmitted to a further embedded processing element included in the plurality of embedded processing elements;

obfuscating a portion of the message to be transmitted to the further embedded processing element; and transmitting the message comprising the obfuscated portion to the further embedded processing element.

8. The computer-implemented method according to claim 1, wherein the embedded computer system is a vehicle control system.

9. The computer-implemented method according to claim 8, wherein upon reconfiguring the at least one embedded processing element from the first mode to the second mode, at least one processing element transmits a notification message reporting the detection of the anomalous message to a driver of the vehicle and/or a vehicle fleet monitoring centre.

10. The computer-implemented method according to claim 8, wherein, upon reconfiguring the at least one embedded processing element from the first mode to the second mode, the reduced functionality of the at least one embedded processing element enables the vehicle to drive with a reduced or minimal feature set.

11. The computer-implemented method according to claim 1, further comprising:

transmitting at least one reset notification to a plurality of the embedded processing elements in the embedded computer system; and at each embedded processing element, reconfiguring the embedded processing element from the second mode to the first mode upon reception, at the embedded processing element, of the reset notification.

12. An embedded computer system, comprising:

a plurality of embedded processing elements;

an intrusion detection system; and a communications network configured to communicably couple the plurality of embedded processing elements and the intrusion detection system;

wherein at least one processing element of the plurality of embedded processing elements and/or the intrusion detection system is configured to detect a transmission of an anomalous message in the embedded computer system, the embedded computer system transitioning from a normal operation to an emergency operation in response to the detection of the transmission of the anomalous message, and, upon the detection of the anomalous message in the embedded computer system, to transmit at least one notification to a further plurality of the embedded processing elements in the embedded computer system, wherein the at least one notification is encrypted using a cryptographic key, and wherein the cryptographic key is a dedicated emergency key used only during the emergency operation and not used during the normal operation of the embedded computer system; and wherein at least one processing element of the further plurality of processing elements is configured to receive the at least one notification, to identify that the at least one notification has been encrypted using the dedicated emergency key, and to reconfigure the at least one processing element from a first mode into a second mode, wherein the at least one processing element presents a reduced functionality to the embedded computer system in the second mode.

13. A vehicle, comprising:

an embedded computer system, including:

a plurality of embedded processing elements;

an intrusion detection system, and a communications network configured to communicably couple the plurality of embedded processing elements and the intrusion detection system, wherein at least one processing element of the plurality of embedded processing elements and/or the intrusion detection system is configured to detect a transmission of an anomalous message in the embedded computer system, the embedded computer system transitioning from a normal operation to an emergency operation in response to the detection of the transmission of the anomalous message, and, upon the detection of the anomalous message in the embedded computer system, to transmit at least one notification to a further plurality of the embedded processing elements in the embedded computer system, wherein the at least one notification is encrypted using a cryptographic key, and wherein the cryptographic key is a dedicated emergency key used only during the emergency operation and not used during the normal operation of the embedded computer system, and wherein at least one processing element of the further plurality of processing elements is configured to receive the at least one notification, to identify that the at least one notification has been encrypted using the dedicated emergency key, and to reconfigure the at least one processing element from a first mode into a second mode, wherein the at least one processing element presents a reduced functionality to the embedded computer system in the second mode.

14. The vehicle according to claim 13, wherein, upon reconfiguration of the at least one processing element of the embedded computer system from the first mode into the second mode, the at least one processing element presents a reduced functionality to the embedded computer system in the second mode, thus causing the vehicle to operate with a reduced feature set.

15. A non-transitory computer-readable medium on which is stored machine readable instructions for mitigating anomalous activity in an embedded computer system, the embedded computer system including a plurality of communicably coupled embedded processing elements, the instructions, when executed by at least one of the embedded processing elements, causing the at least one of the embedded processing elements to perform the following steps:

detecting, by an embedded processing element of the plurality of embedded processing elements, a transmission of an anomalous message in the embedded computer system, the embedded computer system transitioning from a normal operation to an emergency operation in response to the detection of the transmission of the anomalous message;

transmitting, by the embedded processing element upon the detection of the transmission of the anomalous message, at least one notification to a further plurality of the embedded processing elements in the embedded computer system, wherein a portion of the at least one notification is encrypted using a cryptographic key, and wherein the cryptographic key is a dedicated emergency key used only during the emergency operation and not used during the normal operation of the embedded computer system; and by at least one embedded processing element of the further plurality of embedded processing elements:

receiving the at least one notification;

identifying, at the at least one embedded processing element, that the at least one notification has been encrypted using the dedicated emergency key; and reconfiguring the at least one embedded processing element from a first mode into a second mode, wherein the at least one embedded processing element presents a reduced functionality to the embedded computer system in the second mode.

* * * * *